Feb. 19, 1924.  
R. H. MINICH  
CAR BRAKE  
Filed Jan. 16, 1923

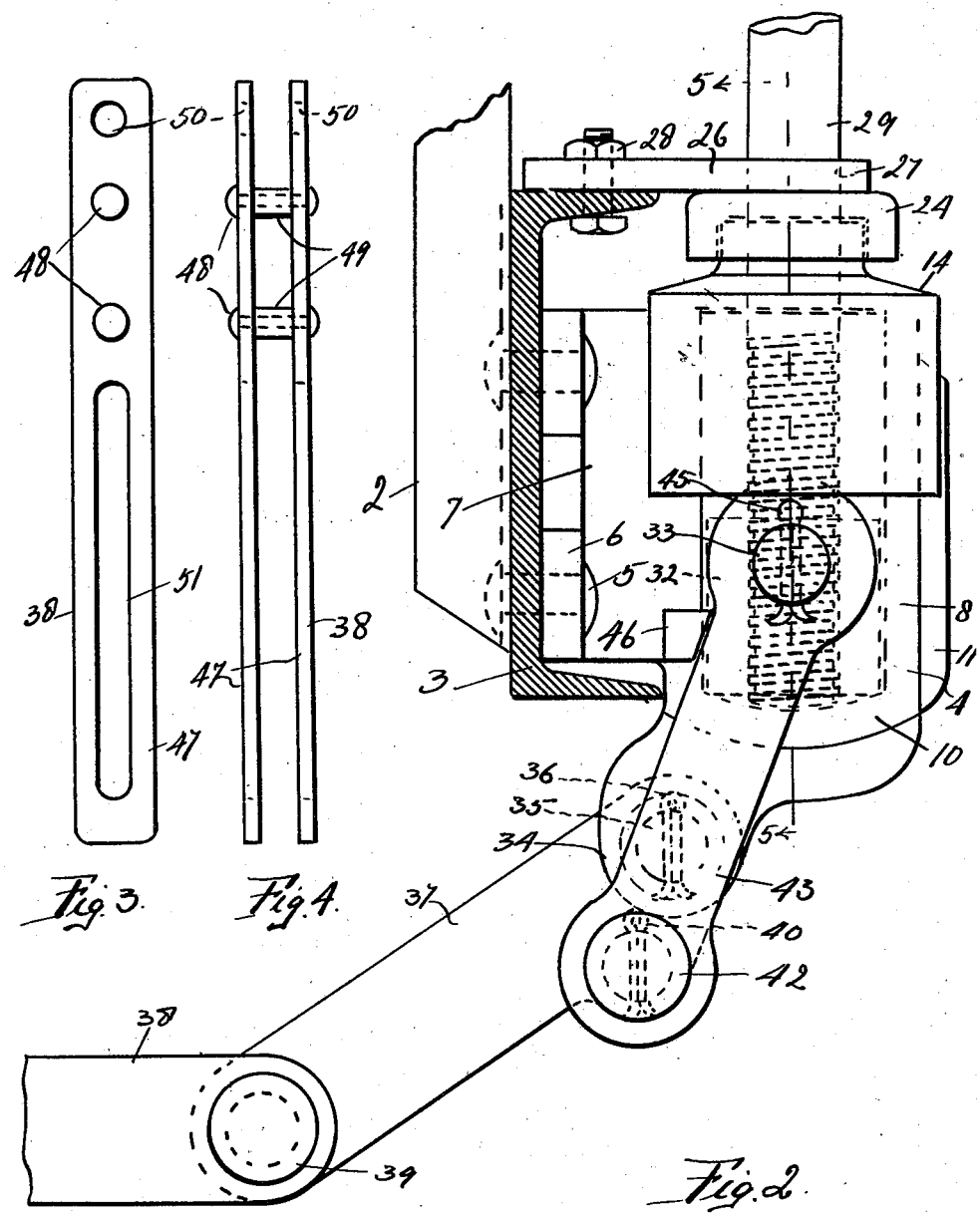

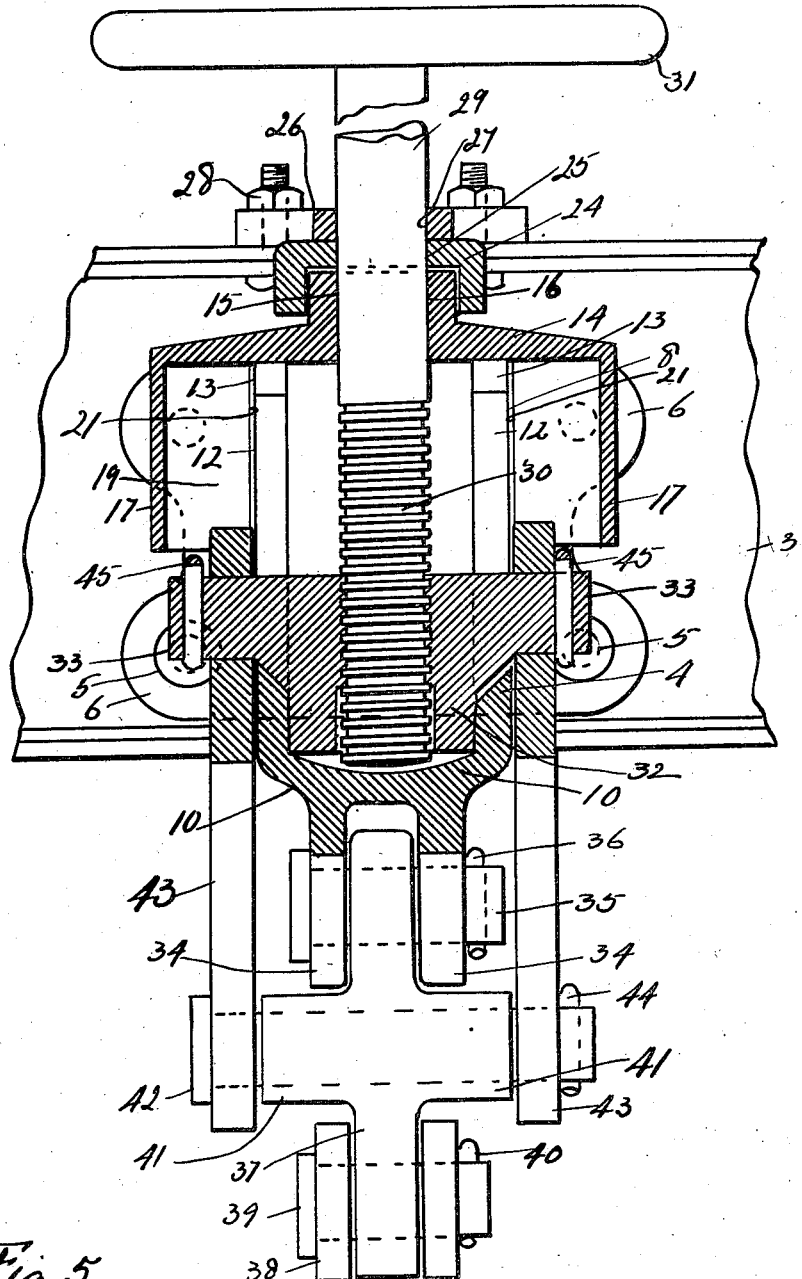

INVENTOR  
Russell H. Minich  
By W. W. Williamson  
Atty.

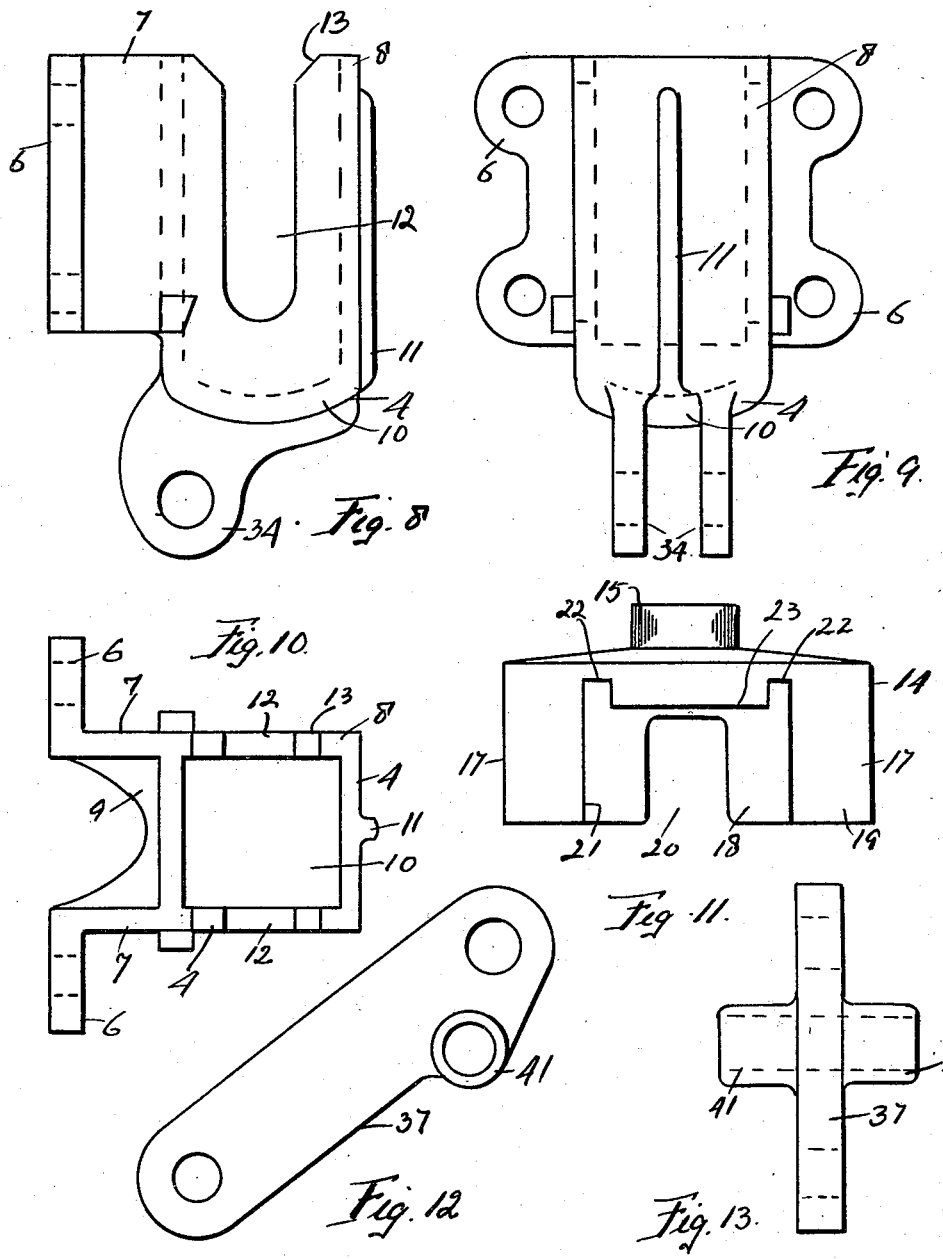

Patented Feb. 19, 1924.

1,483,907

UNITED STATES PATENT OFFICE.

RUSSELL H. MINICH, OF PHILADELPHIA, PENNSYLVANIA, ASSIGNOR TO MINICH RAILWAY APPLIANCE CORPORATION, OF PHILADELPHIA, PENNSYLVANIA, A CORPORATION OF DELAWARE.

CAR BRAKE.

Application filed January 16, 1923. Serial No. 612,937.

*To all whom it may concern:*

Be it known that I, RUSSELL H. MINICH, a citizen of the United States, residing at Philadelphia, in the county of Philadelphia and State of Pennsylvania, have invented new and useful Improvements in a Car Brake, of which the following is a specification.

My invention relates to new and useful improvements in a car brake particularly to that class of car brake known as a hand brake, the same being operated manually, and has for its primary object to provide an improved structure of this character which may be applied to cars of any type and when in use maintains all of the force used.

Another object of the invention is to provide for the elimination of the ordinary ratchet and pawl so that every ounce of energy used in making a braking application will be maintained.

Another object of the invention is to provide for interchangeable mounting of levers of different sizes in order to carry the braking power without affecting the main parts of the apparatus.

A further object of the invention is to so arrange the parts that the forward movement of the brake rod at the beginning of the application of the brake is considerably greater per revolution of the brake wheel than toward the end of the application, thus providing a quick take up of slack and the required amount of power toward the end of the application.

A still further object of the invention is to provide a hand brake consisting of a vertical staff similar to that in common use and attached as usual to the end of the car, a cage or housing into which said staff projects, a nut having threaded engagement with said staff and provided with trunnions projecting through vertical slots in the cage or housing, links pivoted to the trunnions, a lever pivoted beneath the cage or housing with which said links are connected whereby said lever may be moved in the arc of a circle during the vertical movement of the nut and a slotted connecting bar attached to said lever and the ordinary brake rod or cylinder lever, said slot permitting the air brake to operate freely and thereby eliminating the use of a brake chain.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the acompanying drawings forming a part of this application, in which:—

Fig. 2, is a side elevation thereof.

Fig. 3 is a side elevation of the connecting bar on a reduced scale.

Fig. 4, is a plan view thereof.

Fig. 5, is a section at the line 5—5 of Fig. 2.

Fig. 8, is a side elevation on a reduced scale of the brake cage.

Fig. 9, is a front elevation thereof.

Fig. 10, is a plan view of the same.

Fig. 11, is a rear end view of the cage lever.

Fig. 12, is a face view of the operating lever.

Fig. 13, is an edge view thereof.

Figure 1:
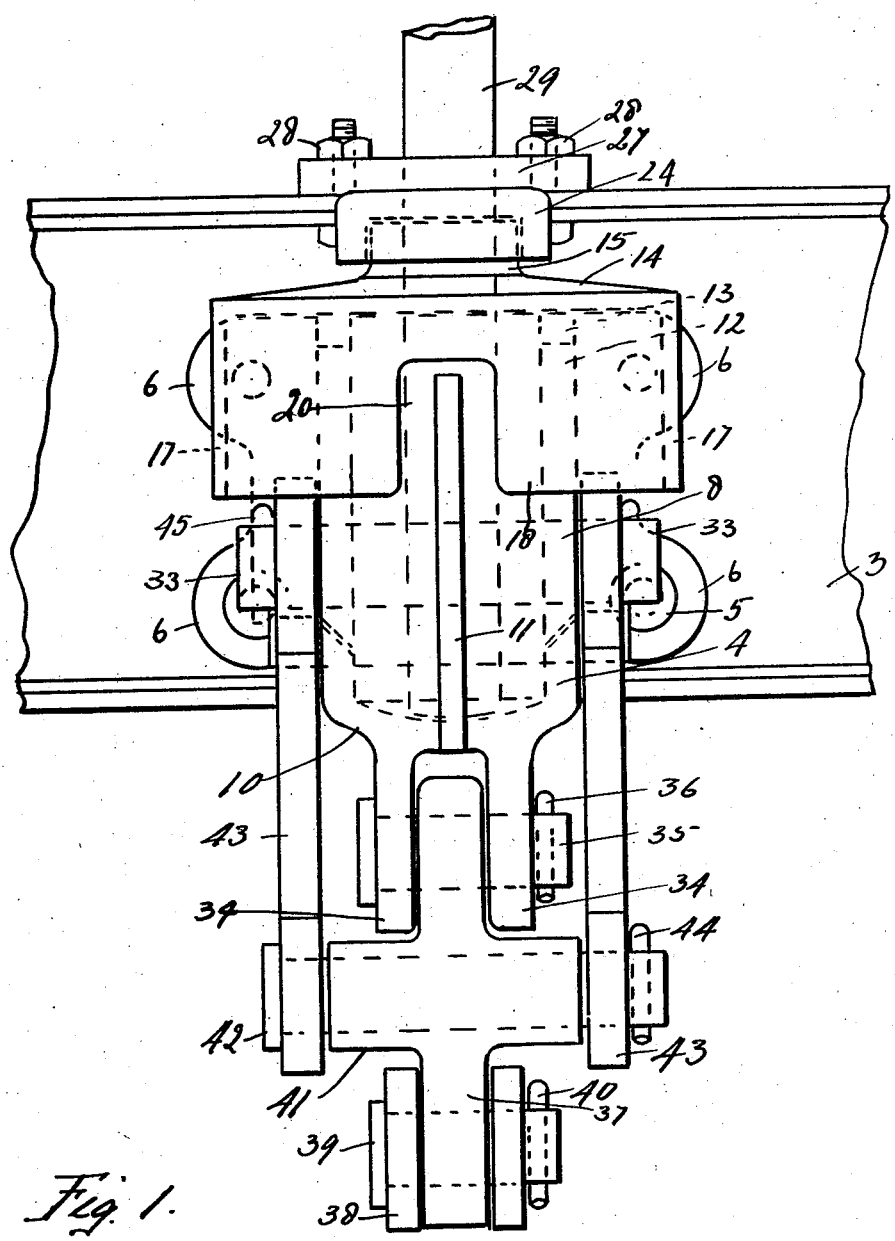
Fig. 1, is a front elevation of my improved hand brake showing its connection with a section of the channel car sill and a portion of the staff being broken away.
Figure 6:
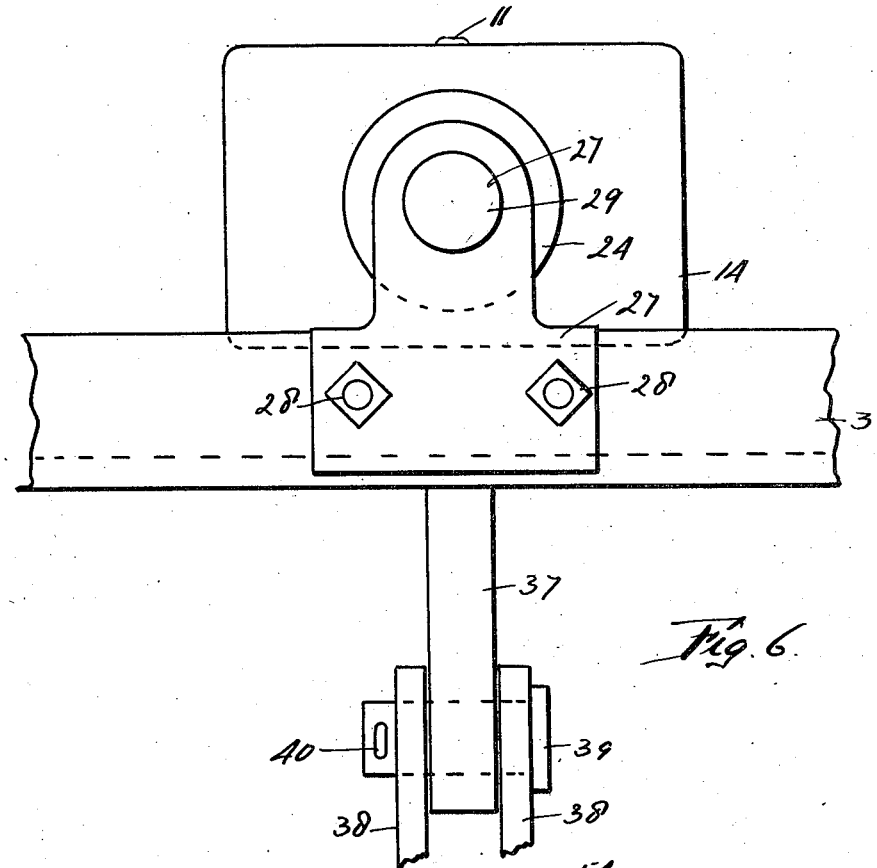
Fig. 6, is a plan view of the same.

In carrying out my invention as here embodied, 2 represents the ordinary channel end post of a car shown in Fig. 2, to which is connected a channel sill 3 and to the body or web of this sill is secured the cage or housing 4 in any suitable or well known manner as by rivets 5 passing through the ears 6 of the rearwardly projecting brackets 7 which are preferably formed integral with the rectangular body 8 of the cage or housing 4, said brackets practically being extensions of the side walls of the cage body and are strengthened or braced by one or more ribs or fillers 9.

The body of the cage is closed at its lower end by a bottom wall 10 but is open at its upper end and the front wall may be strengthened by a rib 11 while in the side walls are formed the parallel vertical slots 12 having flared mouths 13 at their upper ends.

The upper end of the cage is normally closed by a cover 14 the top wall of which has a boss 15 formed therewith and has a hole 16 therethrough for the reception of the brake staff to be later described. The cover 14 is somewhat wider than the body of the cage so as to leave spaces between the side walls of said cage body and the side flanges 17 of the cover while the front and rear flanges 18 and 19 respectively of said cover approximately fit said cage body and the forward flange has a notch 20 to receive the rib 11 while the rear flange has a cutaway portion 21 to straddle the brackets 7 and from this cutaway portion project notches 22 for registration with said brackets leaving an apron 23 which projects downward between the brackets or of such length that it will not contact with the uppermost filler 9.

On top of the boss 15 which is preferably circular in cross section is mounted a cap 24 having a hole 25 through its top wall for registration with the hole 16 in the boss and this cap and the cover 14 are held in place by the staff retainer 26 which overlies the cap 24 and has a hole 27 to align with the holes 25 and 16, said staff retainer being preferably secured to one of the flanges of the sill by suitable fastening means such as bolts and nuts indicated by the numeral 28.

The brake staff 29 passes through the holes 27, 25 and 16 into the body of the cage and rests upon the bottom thereof and that portion of the staff within the body of the cage is threaded as indicated at 30. On the upper end of the staff is a hand wheel 31 for revolving said staff as will be obvious.

Within the body of the cage is located a wing nut 32 for vertical movement and has threaded connection with the threaded portion of the staff 29 while the wings thereof which project through the vertical slots 12 are so formed as to produce trunnions 33 having their ends projecting beyond the outer faces of the cage walls but of such length as to pass within the cover 14 as will be obvious by reference to Fig. 5.

From the bottom of the cage projects a pair of spaced legs or hangers 34 so constructed that the pin 35 when in place is considerably to the rear of a line passing through the axial center of the staff, said pin preferably having a head on one end and being held in place by a cotter pin 36 or its equivalent. On the pin 35 between the hangers 34 is rotatably mounted or journalled the upper end of the operating lever 37 while to the lower or free end of said lever is connected one end of the connecting bar 38 by means of a headed pin 39 held in place by a cotter pin 40 or its equivalent. Adjacent the uppermost or pivoted end of the lever are formed a pair of oppositely projecting bosses 41 through which passes a headed pin 42 of sufficient length to project beyond the ends of said bosses and on these projecting ends are pivoted the lower ends of the links 43, said pin being held in place by a cotter pin 44 or its equivalent. The upper ends of the link 43 are journalled upon the trunnions 33 of the winged nut and held in place by cotter pins 45 or their equivalent.

In order to prevent the longitudinal center of the links 43 from passing the axial center of the pin 35, or in other words, the pivotal center of the operating lever 37 a lug 46 is formed on the outer surface of each side of the cage to act as stops and thereby limit the releasing movements of the parts.

The connecting bar 38 as illustrated in Figs. 3 and 4 comprises two parallel members 47 joined together by rivets 48 or their equivalent with spacing sleeves 49 mounted thereon between said members. At one end these members are provided with aligning holes 50 by which the connecting bar is pivoted to the pin 39 while at the other end these members are provided with aligning slots 51 through which passes a suitable fastening device for attaching the connecting bar to the ordinary brake rod or cylinder lever said slot, when the hand brake is in an inoperative position, allowing the air brake to operate freely without the use of the objectionable brake chain.

In practice the cage or housing may be applied to any suitable portion of a car but preferably the end sill thereof, as hereinbefore stated.

As the brake staff is revolved in the proper direction the winged nut 32 will move upward within the cage body which will cause the links 43 to move the operating lever 37 in the arc of a circle about its pivot point 35 thereby actuating the brake rigging in the proper direction to apply the brakes.

The wing nut, through the medium of which power is transmitted from the brake staff to the links and operating lever, being threaded upon the staff makes it unnecessary to use a pawl and ratchet for holding the parts in their applied positions and to release the brake it is only necessary to reverse the rotation of the staff. This releasing of the brakes cannot be accomplished suddenly as happens where a chain and ratchet and pawl are used thus preventing the possibility of trainmen being thrown from the car during the releasing of the brakes should the hand wheel be suddenly released or by the parting of a chain during the application of the brakes.

Figure 7:
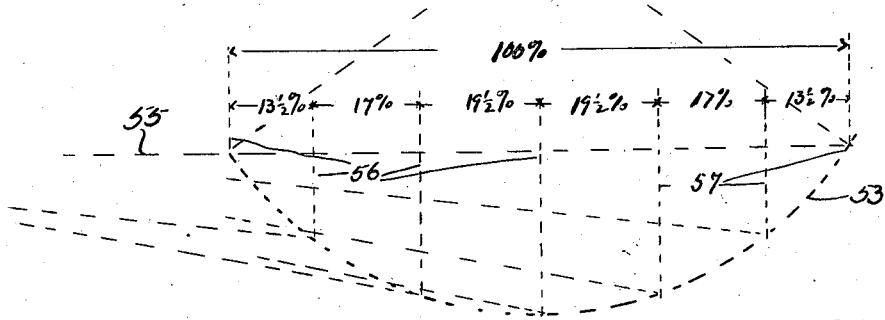
Fig. 7, is a diagram illustrating the movement of the brake rod relative to the lever.

As the operating lever 37 moves in the arc of a circle represented by the numeral 53 in the diagram illustrated in Fig. 7, about a center designated 54 the forward movement of the brake rod or cylinder lever in a straight line indicated by the numeral 55 will be considerably greater per revolution of the brake wheel for the first part of the movement of the operating lever as indicated by the lines 56 which form divisions indicating degrees of movement and it is to be understood that the figures within each of these divisions are only approximate thus providing for a quick take up of the slack at the beginning of the braking operations.

In approximately the same ratio the forward movement of the brake parts will decrease toward the end of the movement of the operating lever or the application of the brake as indicated by the divisions between the lines 57 thus giving the required amount of power toward the end of the application causing the brakes to be firmly forced into engagement with the wheels of the car without the necessity of using a brake stick or club.

It is to be particularly noted that the amount of power exerted upon the brake may be readily changed by providing operating levers of different lengths or by varying distances between the different pivot points thereon.

Of course I do not wish to be limited to the exact details of construction as herein shown as these may be varied within the limits of the appended claims without departing from the spirit of my invention.

Having thus fully described my invention, what I claim as new and useful is:—

1. A car brake comprising a cage having slots therein and provided with hangers at the bottom thereof, a rotatable staff projecting into said cage, a wing nut threaded on said staff within the cage, trunnions carried by said nut and projecting through the slots in said cage, an operating lever journalled between the hangers and adapted to be connected with a brake rigging, and links pivoted to the trunnions of the nut and to the operating lever intermediate its ends to one side of its longitudinal center.

2. A car brake comprising a cage having vertical slots therein, hangers projecting from the bottom of said cage, a rotatable staff projecting into said cage, a nut for threaded connection with said staff within the cage trunnions carried by said nut and projecting through the vertical slots, an operating lever journalled between the hangers to one side of a line running through the axial center of the staff, the free end of said lever adapted to be connected with a brake rigging, and links journalled on the trunnions of the nut and to the operating lever intermediate its ends to one side of the longitudinal center of the operating lever.

3. A car brake comprising a cage, a staff projecting into said cage, a nut within the cage having threaded engagement with the staff, trunnions carried by said nut and passing through slots in the cage, a lever pivoted to the bottom of the cage, a connecting bar pivoted to the outer end of the operating lever and connected with a brake rigging, and links journalled on the trunnions and pivotally connected with the operating lever, a car brake comprising a cage, a staff projecting into said cage, means within said cage having threaded connection with the staff, an operating lever pivoted beneath the cage so as to move in the arc of a circle from one side of a vertical line through its pivot point to the other side of said line whereby the forward movement of an element connected with the outer free end of said lever will be considerably greater per revolution of the staff during the movement of said lever toward the vertical slots thus providing a quick take up of slack and an increase of power toward the end of the braking application and means connected with the operating lever and the means within the cage for actuating said lever.

4. A car brake comprising a cage having vertical slots therein, a staff projecting into said cage, a nut within the cage having threaded engagement with the staff, trunnions carried by said nut projecting through said slots, links journalled on the trunnions, a connecting bar attached to a brake rigging, and interchangeable means pivoted to the bottom of the cage, the connecting bar and said links for changing the ratio exerted upon the brake rigging.

5. A car brake comprising a cage having vertical slots therein, a staff projecting into said cage, a nut within the cage having threaded engagement with the staff, trunnions carried by said nut projecting through said slots, links journalled on the trunnions, a connecting bar attached to a brake rigging, and interchangeable levers for pivotal connection with the underside of the cage, the connecting bar and links, the connecting points of the lever with the cage and links being differently spaced.

6. A brake of the class described comprising in combination, a cage closed at the bottom and open at the top and having vertical slots in its side walls, hangers projecting from the bottom of said cage, a cover for said cage of greater width than said cage and to provide spaces between the sides of the cage and the side flanges of said cover, said cover having a hole therethrough, a boss on the cover surrounding said hole, an apertured cap over said boss, an apertured staff retainer overlying said cap, a staff projecting through the retainer, cap and cover and into the case, a nut having threaded connection with that portion of the staff within the cage, trunnions carried by said nut and projecting through the slots in the cage, said trunnions being of such length as to pass within the spaces between the cage and cover, an operating link journalled between the hangers, links journalled on the trunnions and connected with the operating lever at a point to one side of the longitudinal center of said lever, a connecting bar attached to the outer free end of the operating lever and adapted to be connected with a brake rigging, means carried by the cage for coaction with the links to limit the rearward movement of said links.

In testimony whereof, I have hereunto affixed my signature.

RUSSELL H. MINICH.